United States Patent [19]
Kitamura et al.

[11] Patent Number: 5,661,974
[45] Date of Patent: *Sep. 2, 1997

[54] CONTROL SYSTEM WITH FUNCTION OF PROTECTING CATALYTIC CONVERTER FOR INTERNAL COMBUSTION ENGINES FOR VEHICLES

[75] Inventors: Toru Kitamura; Akira Katoh; Sakae Suzuki, all of Wako, Japan

[73] Assignee: Honda Giken Kogyo Kabushiki Kaisha, Tokyo, Japan

[*] Notice: The term of this patent shall not extend beyond the expiration date of Pat. No. 5,620,049.

[21] Appl. No.: 570,570

[22] Filed: Dec. 11, 1995

[30] Foreign Application Priority Data

Dec. 14, 1994 [JP] Japan ................. 6-333179

[51] Int. Cl.⁶ ........................................... F01N 3/00
[52] U.S. Cl. ........................................... 60/285
[58] Field of Search ................................. 60/285

[56] References Cited

U.S. PATENT DOCUMENTS

| | | | |
|---|---|---|---|
| 5,343,700 | 9/1994 | Fujimoto et al. | 60/285 |
| 5,398,501 | 3/1995 | Ito et al. | 60/285 |
| 5,417,060 | 5/1995 | Ishida et al. | 60/285 |
| 5,473,887 | 12/1995 | Takeshima et al. | 60/285 |
| 5,473,889 | 12/1995 | Ehard et al. | 60/285 |
| 5,491,975 | 2/1996 | Yamashita et al. | 60/285 |
| 5,501,073 | 3/1996 | Miyashita et al. | 60/285 |
| 5,537,817 | 7/1996 | Akazaki et al. | 60/285 |
| 5,544,482 | 8/1996 | Matsumoto et al. | 60/277 |

FOREIGN PATENT DOCUMENTS 53-40128    4/1978    Japan .

*Primary Examiner*—John T. Kwon
*Attorney, Agent, or Firm*—Armstrong, Westerman, Hattori, McLeland & Naughton

[57] ABSTRACT

A control system for an internal combustion engine for use in a vehicle. An ECU determines whether the catalytic converter is in a predetermined high temperature condition, and also determines whether the engine has continuously been in an operating condition in which the rotational speed of the engine exceeds a predetermined value and load on the engine exceeds a predetermined value, over a predetermined time period. When the catalytic converter is in the predetermined high temperature or when the engine has continuously been in the above high speed and high load condition over the predetermined period, the ECU controls the throttle valve in a manner such that the opening of the throttle valve is decreased.

11 Claims, 6 Drawing Sheets

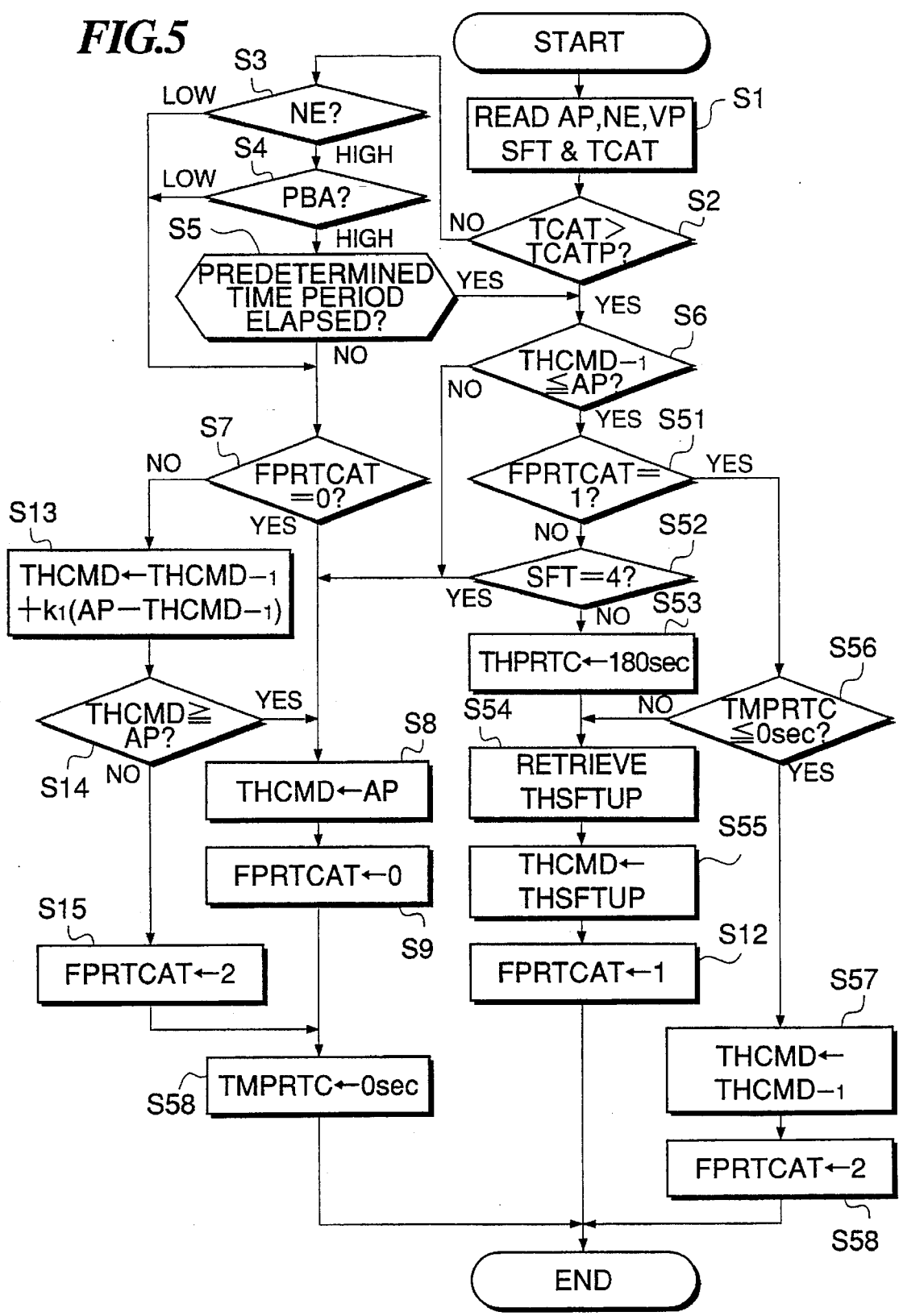

1

CONTROL SYSTEM WITH FUNCTION OF PROTECTING CATALYTIC CONVERTER FOR INTERNAL COMBUSTION ENGINES FOR VEHICLES

BACKGROUND OF THE INVENTION

1. Field of the Invention

This invention relates to a control system for internal combustion engines for vehicles, and particularly to a control system for an automotive internal combustion engine which is equipped with a so-called DBW (Drive By Wire) system, which electrically controls the opening of a throttle valve of the engine according to an operating amount of an accelerator pedal of the vehicle.

2. Prior Art

A control system for internal combustion engines for vehicles is known, for example, from Japanese Laid-Open Patent Publication (Kokai) No. 53-40128, which is intended to prevent deterioration and capacity loss of a catalytic converter of the engine during the operation of the engine in a high rotational speed and high load condition, and controls the air-fuel ratio of an air-fuel mixture supplied to the engine to a richer side than a stoichiometric air-fuel ratio to effect cooling by fuel to thereby control the temperature of the catalytic converter to a value lower than a predetermined value, when the engine is operating in such a high rotational speed and high load condition.

However, according to the known control system, the air fuel ratio of the air-fuel mixture deviates to the richer side than the stoichiometric air-fuel ratio, and as a result, the purification ratio of the catalytic converter can be degraded, so that exhaust gases with increased amounts of noxious components are emitted from the engine.

Further, according to the known control system, the amount of fuel is increased due to the enriching of the air-fuel ratio of the air-fuel mixture, which degrades the fuel economy.

SUMMARY OF THE INVENTION

It is the object of the invention to provide a control system for internal combustion engines for vehicles, which is not only capable of preventing deterioration and capacity loss of a catalytic converter of the engine, but also capable of preventing an increase in the amount of noxious components in exhaust gases emitted from the engine and degradation of the fuel economy.

To attain the above object, the present invention provides a control system for an internal combustion engine for use in a vehicle, the engine having an intake system, intake air amount-regulating means associated with the intake system, for regulating an amount of intake air supplied to the engine, an exhaust system, and a catalytic converter arranged in the exhaust system, for purifying noxious components present in exhaust gases emitted from the engine, comprising:

temperature-determining means for determining whether the catalytic converter is in a predetermined high temperature condition;

operating condition-determining means for determining whether the engine has continuously been in an operating condition in which rotational speed of the engine exceeds a predetermined value and load on the engine exceeds a predetermined value, over a predetermined time period; and control means responsive to at least one of outputs from the temperature-determining means and the operating condition-determining means, for controlling the intake air amount-regulating means in a manner such that the amount of intake air supplied to the engine is decreased.

Preferably, the vehicle has an accelerator pedal, the intake air mount-regulating means comprising a throttle valve, the engine including electric driving means for electrically driving the throttle valve in response to a position of the accelerator pedal, the control means controlling the electric driving means to drive the throttle valve so as to reduce the opening of the throttle valve in response to at least one of the outputs from the temperature-determining means and the operating condition-determining means.

More preferably, the temperature-determining means includes at least one of exhaust system temperature-detecting means for detecting temperature of the exhaust system, and catalyst temperature-detecting means for directly detecting temperature of the catalytic converter, the temperature-determining means determining that the catalytic converter is in the predetermined high temperature condition when at least one of the temperature detected by the exhaust system temperature-detecting means and the temperature detected by the catalyst temperature-detecting means exceeds a predetermined value.

Also preferably, the vehicle includes an automatic transmission, the control means including transmission control means for reducing a reduction gear ratio of the automatic transmission when the control means controls the electric driving means so as to reduce the opening of the throttle valve.

More preferably, the control means includes inhibiting means for inhibiting the transmission control means from further reducing the reduction gear ratio of the automatic transmission, over a predetermined time period after the transmission control means reduced the reduction gear ratio of the automatic transmission.

Also preferably, the transmission control means reduces the reduction ratio of the automatic transmission by setting a desired opening value of the throttle valve according to speed of the vehicle.

Preferably, the control means controls the electric driving means to reduce the opening of the throttle valve in response to at least one of the outputs from the temperature-determining means and the operating condition-determining means, when the desired opening value of the throttle valve is below a value corresponding to the position of the accelerator pedal.

Advantageously, the control means controls the electric driving means to progressively reduce the opening of the throttle valve at a rate based on the rotational speed of the engine.

The above and other objects, features and advantages of the invention will become more apparent from the following detailed description taken in conjunction with the accompanying drawings.

BRIEF DESCRIPTION OF THE DRAWINGS

FIG. 5 is a flowchart showing a program for carrying out control of the engine operation according to another embodiment of the invention;

DETAILED DESCRIPTION

The invention will now be described in detail with reference to the drawings showing embodiments thereof.

Figure 1:
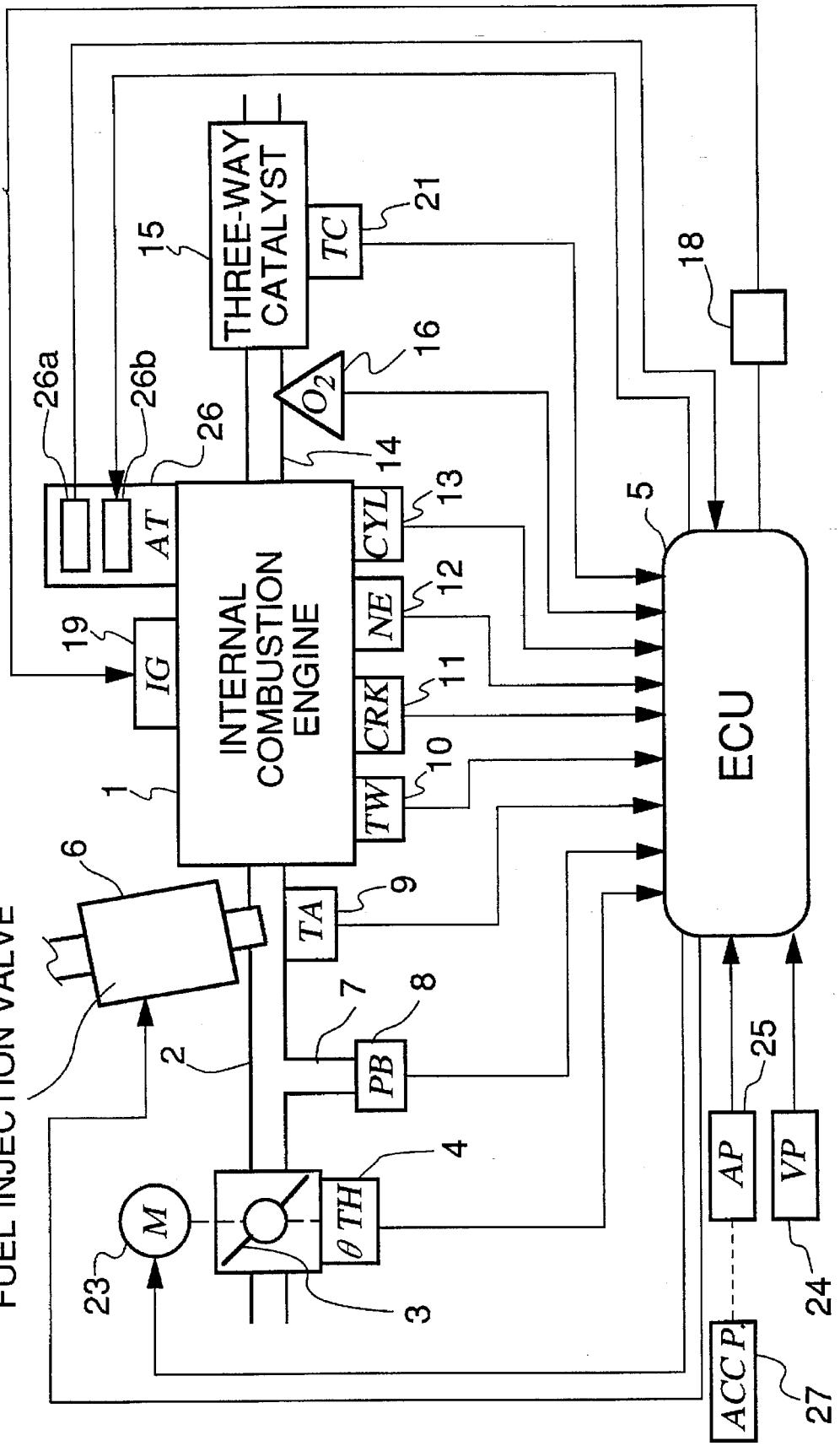
FIG. 1 is a block diagram schematically showing the whole arrangement of an internal combustion engine and a control system therefor, according to an embodiment of the invention.

Referring first to FIG. 1, there is illustrated the whole arrangement of an internal combustion engine (hereinafter simply referred to as "the engine") and a control system therefor, according to an embodiment of the invention.

In the figure, reference numeral 1 designates an engine, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for generating an electric signal indicative of the sensed throttle valve opening TH to the ECU 5.

The engine 1 employs the DBW system. Further electrically connected to the ECU 5 are a throttle actuator 23 for driving the throttle valve 3 and an accelerator pedal position (AP) sensor 25 for detecting the position AP of an accelerator pedal 27. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with coolant, for supplying an electric signal indicative of the sensed engine coolant temperature TW to the ECU 5.

A cylinder-discriminating sensor (hereinafter referred to as "the CYL sensor") 13, an engine rotational speed (NE) sensor 12, and a crank angle (CRK) sensor 11 are arranged in facing relation to a camshaft or a crank shaft of the engine 1, neither of which is shown. The CYL sensor 13 generates a signal pulse (hereinafter referred to as "a CYL signal pulse") at a predetermined crank angle of a particular cylinder of the engine 1. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18. Further connected to the ECU 5 is a well-known automatic transmission 26 which is provided with a hydraulic pressure control circuit 26b for controlling the operations of a lock-up clutch and a gear mechanism, neither of which is shown, and a gear position sensor 26a for detecting the shift position SFT. The hydraulic pressure control circuit 26b and the gear position sensor 26a are electrically connected to the ECU 5.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5.

The catalytic converter 15 is provided with a temperature sensor 21 for detecting the temperature of the catalytic converter 15, which is electrically connected to the ECU 5. Further electrically connected to the ECU 5 is a vehicle speed sensor 24 for detecting the speed of a vehicle in which the engine 1 is installed and supplying a signal indicative of the sensed vehicle speed VP to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which outputs driving signals to the fuel injection valves 6 and the distributor 18, etc.

The CPU of the ECU 5 operates in response to signals from various engine parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$Tout = Ti \times KO2 \times K1 + K2 \quad (1)$$

where Ti represents a basic value of the fuel injection period Tout, which is determined according to the engine rotational speed NE and the intake pipe absolute pressure PBA, by the use of a Ti map, not shown, and stored in the memory means.

KO2 represents an air-fuel ratio correction coefficient calculated based on the output signal from the O2 sensor 16, which is set to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability.

Further, the CPU of the ECU 5 calculates the ignition timing θ IG of the engine, based on the determined engine operating conditions. Driving signals corresponding to the TOUT and θ IG values calculated as above are delivered via the output circuit to the fuel injection valves 6 and the spark plugs 19, respectively, to drive them.

Figure 2:
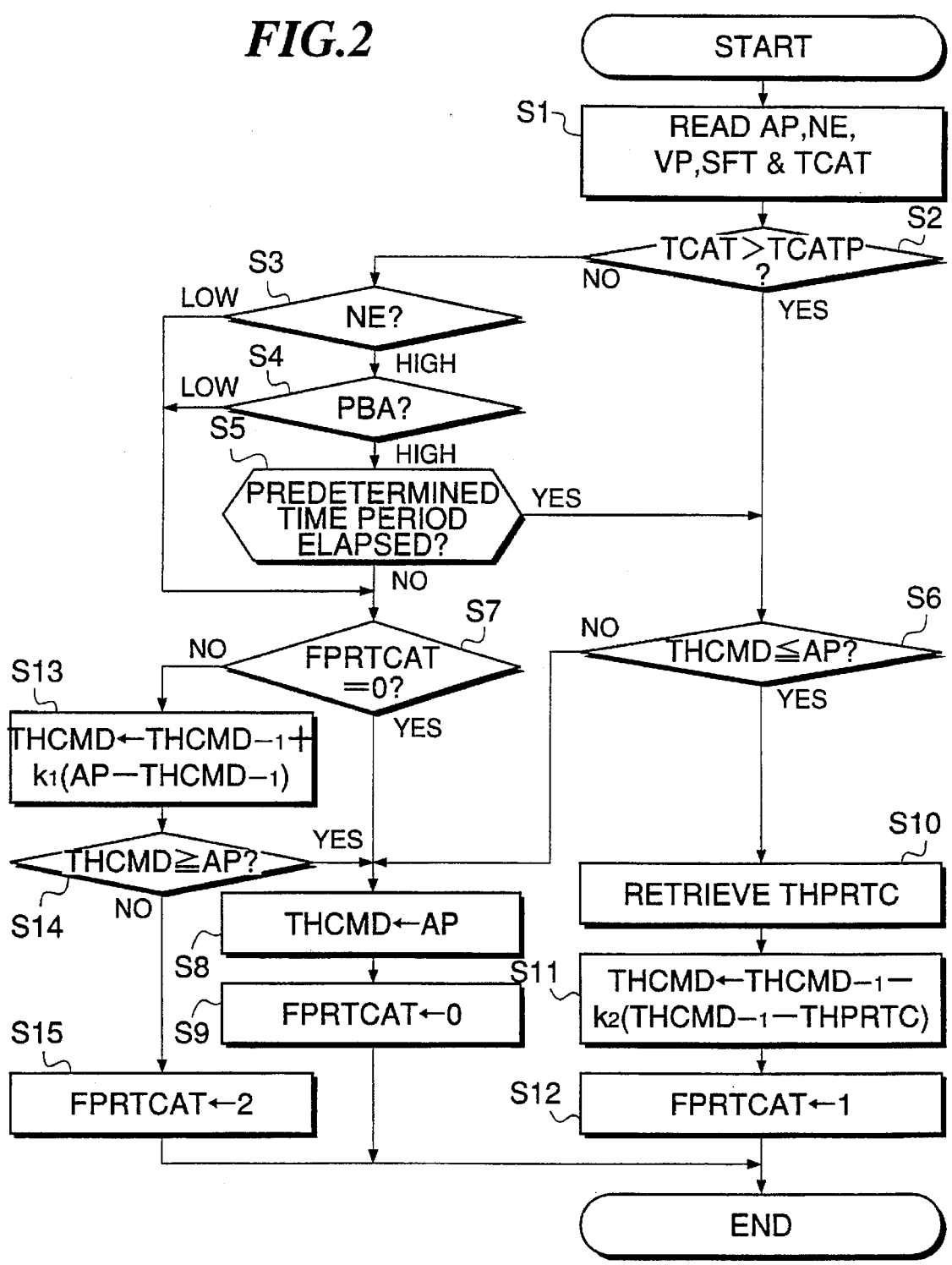
FIG. 2 is a flowchart showing a program for carrying out control of the engine operation, which is executed by an ECU in order to protect a catalytic converter of the engine, according to the embodiment of the invention.

FIG. 2 shows a program for carrying out control of the engine operation, which is executed by the ECU 5 to protect the catalytic converter 15.

First, at a step S1, the ECU 5 reads in the accelerator pedal position AP, the engine rotational speed NE, the vehicle speed VP, the shift position SFT, and the catalyst temperature TCAT, from the accelerator pedal position sensor 25, the NE sensor 12, the vehicle speed sensor 24, the gear position sensor 26a, and the catalyst temperature sensor 21, respectively.

Then, it is determined at a step S2 whether or not the read-in catalyst temperature TCAT is higher than an upper limit value TCATP which is suitable for protecting the catalyst. The upper limit value TCATP is provided with a hysteresis.

Figure 3:
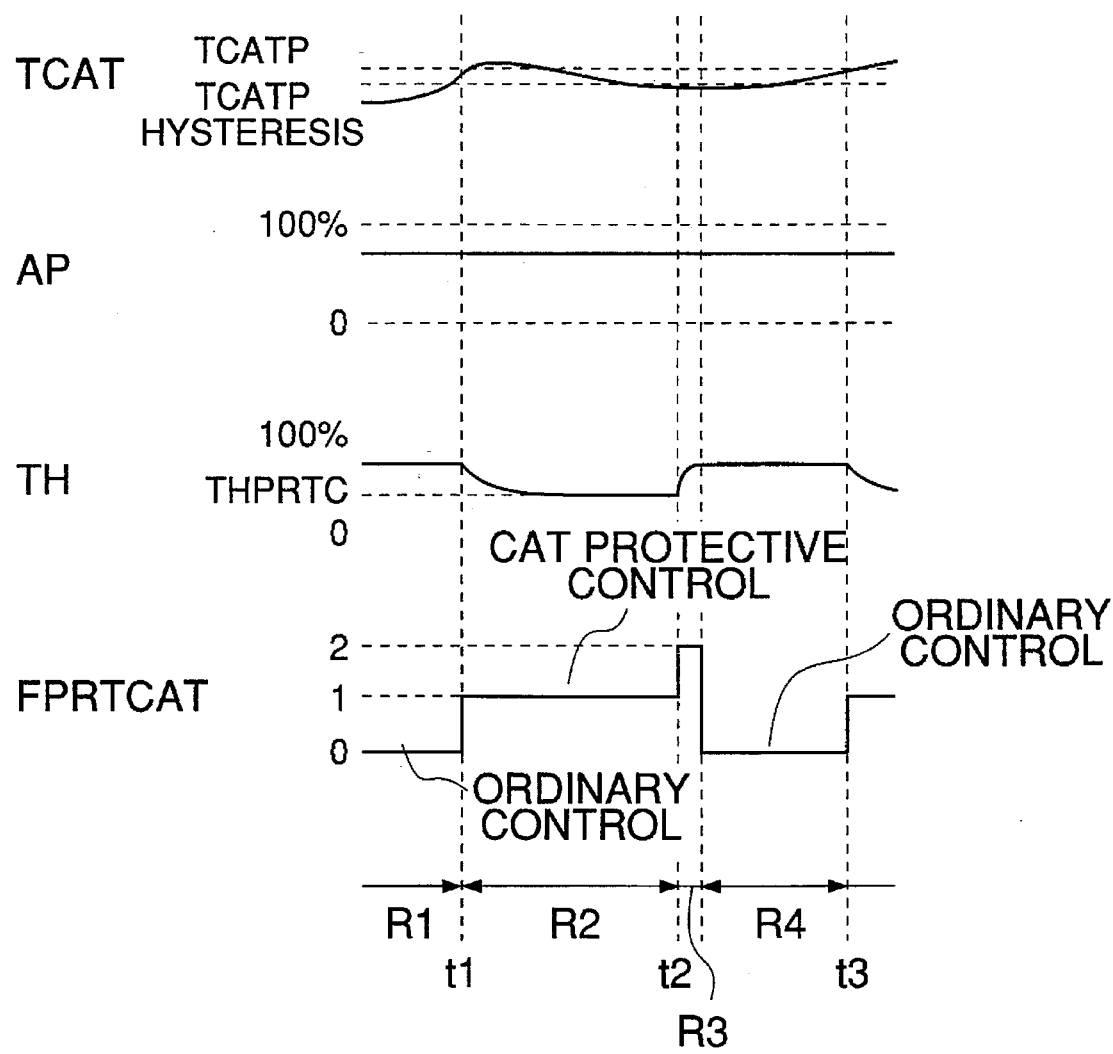
FIG. 3 is a timing chart showing the relationship between a catalyst temperature TCAT; an accelerator pedal position AP, and a throttle valve opening TH.

FIG. 3 shows changes in the catalyst temperature TCAT, accelerator pedal position AP, and throttle valve opening TH with the lapse of time. The present routine will be further described with reference to the timing chart of FIG. 3.

If it is determined at the step S2 that the catalyst temperature TCAT exceeds the upper limit value TCATP, the program proceeds to a step S6. On the other hand, if the TCAT value does not exceeds the upper limit value TCATP, it is determined at a step S3 whether or not the engine rotational speed NE exceeds a predetermined value. If the engine rotational speed NE exceeds the predetermined value, it is determined at a step S4 whether or not the intake pipe absolute pressure PBA exceeds a predetermined value. If the engine rotational speed NE exceeds the predetermined value and at the same time the intake pipe absolute pressure PBA exceeds the predetermined value, i.e. if the engine is operating in a high speed and high load condition, it is determined at a step S5 whether or not the condition has continued over a predetermined time period, which means whether or not the engine is operating in a condition under which the catalyst temperature can exceed the upper limit value TCATP.

On the other hand, if it is determined at the steps S3 and S4 that the engine is not operating in the high speed and high load condition, or it is determined at the step S5 that the high speed and high load condition has not continued over the predetermined time period, the program proceeds to a step S7, wherein it is determined whether or not a protection flag FPRTCAT is reset to "0". The protection flag FPRTCAT is set to "1" or "2" when the present engine operation control for catalyst protection is being carried out, while it is reset to "0" when ordinary engine operation control is being carried out.

In a region R1 in FIG. 3, the ordinary engine operation control is carried out, and therefore the protection flag FPRTCAT remains reset to "0". Therefore, if the answer to the question of the step S7 is affirmative (YES), the program proceeds to a step S8, wherein the ECU 5 determines a throttle valve opening command value THCMD according to the detected accelerator pedal position AP from the accelerator pedal position sensor 25, and delivers the THCMD value to the throttle actuator 23, to thereby control the throttle valve 3. Then, the protection flag FPRTCAT is reset to "0" at a step S9, followed by terminating the present routine.

If it is determined at the step S2 that the catalyst temperature TCAT exceeds the upper limit value TCATP (at a time point t1 in FIG. 3), or if it is determined at the steps S3, S4 and S5 that the high speed and high load condition of the engine has continued over the predetermined time period, the program proceeds to the step S6.

Figure 4:
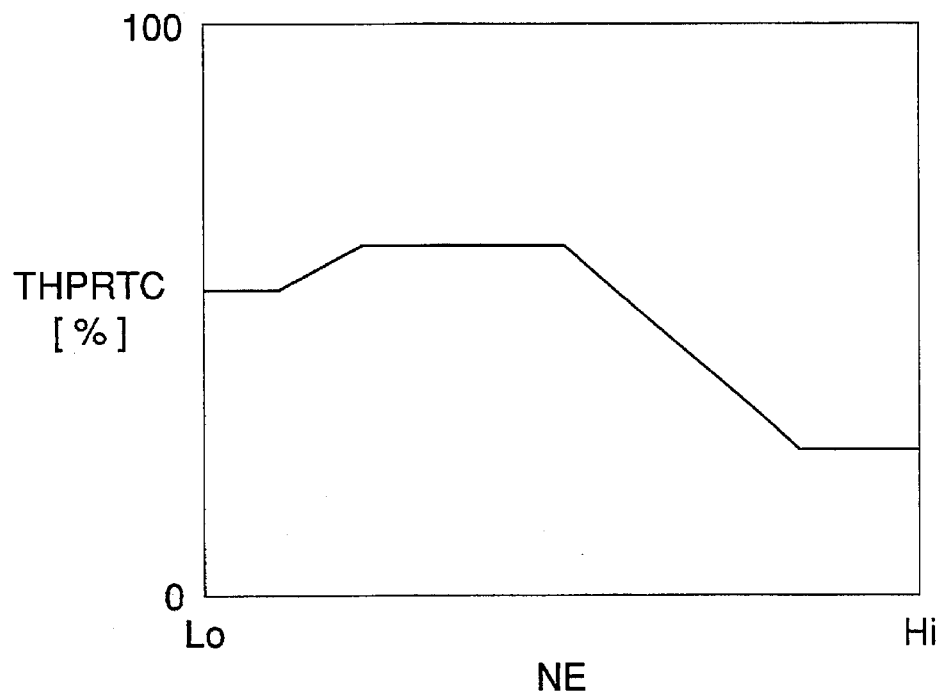
FIG. 4 shows a table which is used for determining a throttle valve opening THPRTC for catalyst protection according to engine rotational speed NE.

At the step S6, it is determined whether or not the present value of the accelerator pedal position AP is larger than a value corresponding to the throttle valve opening command value THCMD (indicated as THCMD≤AP at the step S6). If the answer is affirmative (YES), a catalyst protective throttle valve opening THPRTC applied when the vehicle is in an almost steady speed traveling condition is read from a table shown in FIG. 4 according to the engine rotational speed NE at a step S10.

Then, the throttle valve opening command value THCMD is progressively decreased according to the catalyst protective throttle valve opening THPRTC at a step S11, by the use of the following equation (2), to thereby progressively decrease the opening of the throttle valve 3 to protect the catalyst:

$$THCMD = THCMD_{-1} - k2(THCMD_{-1} - THPRTC) \quad (2)$$

where $THCMD_{-1}$ represents the last value of the throttle valve opening command value THCMD, and k2 represents an averaging coefficient which is set to a positive value equal to 1 or less.

Then, the protection flag FPRTCAT is set to "1" at a step S12, followed by terminating the present routine.

By thus progressively decreasing the opening of the throttle valve 3, the catalyst temperature TCAT is progressively lowered, as shown in a region R2 in FIG. 3.

If it is determined at the step S6 that the present value of the accelerator pedal position AP does not exceed a value corresponding to the throttle valve opening command value THCMD, the program proceeds to the step S8 and then to the step S9, whereby the ordinary engine operation control is carried out such that the throttle valve opening command value THCMD is set to a value just corresponding to the accelerator pedal position AP.

Thereafter, if it is determined at the step S2 that the catalyst temperature TCAT becomes lower than the upper limit value TCATP, and at the same time it is determined at the step S3 that the engine 1 is not operating in a high speed condition or at the step S4 that the engine is not in a high load condition, or the high speed and high load condition has not continued over the predetermined time period at the step S5, the answer to the question of the step S7 becomes negative (NO), since the protection flag FPROTCAT is then equal to "1", and then the program proceeds to a step S13.

At the step S13, the throttle valve opening command value THCMD is progressively returned to a value corresponding to a value of the accelerator pedal position AP required by the driver, as shown in a region R3 in FIG. 3, by the use of the following equation (3):

$$THCMD = THCMD_{-1} + k1(AP - THCMD_{-1}) \quad (3)$$

where k1 represents an averaging coefficient which is set to a positive value equal to 1 or less.

Then, it is determined at a step S14 whether or not the throttle valve opening command value THCMD exceeds a value corresponding to the accelerator pedal position AP, and if the answer is negative (NO), the protection flag FPRTCAT is set to "2" at a step S15 (at a time point t2 in FIG. 3), followed by terminating the present routine.

On the other hand, if the throttle valve opening command value THCMD exceeds a value corresponding to the accelerator pedal position AP, the program proceeds to the step S8 to set the accelerator pedal position AP to a value corresponding to the throttle valve opening command value THCMD, and then at the step S9 the protection flag FPRTCAT is reset to "0", followed by returning to the ordinary engine operation control, as shown in a region R4 in FIG. 3.

As described above, according to the present embodiment, when the catalyst temperature TCAT exceeds the upper limit value TCATP, or when a high speed and high load condition of the engine has continued over the predetermined time period, the opening of the throttle valve 3 is progressively decreased to lower the catalyst temperature TCAT. As a result, good drivability of the engine is ensured and an abnormal increase in the temperature of the catalytic converter 15 can be restrained, to thereby prevent deterioration and capacity loss of the catalytic converter. Besides, an increase in the amount of noxious components in exhaust gases as well as degradation in the fuel economy can be minimized.

The engine control system according to the present embodiment can be applied to either a vehicle with an automatic transmission or a vehicle with a manual transmission. Although in the present embodiment the temperature sensor 21 is provided for the catalytic converter 15 for directly detecting the temperature of the same, a temperature sensor may be arranged in the exhaust pipe 14 in place of, or in addition to the temperature sensor 21 to detect the temperature of the exhaust pipe 14 as representative of the temperature of the catalytic converter 15. Further alternatively, the catalyst temperature may be estimated from one or more engine operating parameters such as the intake pipe absolute pressure PBA and the engine rotational speed NE.

Next, description will be made of a second embodiment of the invention. The control system according to the second embodiment is applied only to a vehicle equipped with an automatic transmission.

The control system according to the present embodiment is identical in basic construction to the first embodiment shown in FIG. 1. FIG. 5 shows a program for carrying out control of the engine operation according to the second embodiment. Steps corresponding to those in FIG. 2 are designated by identical numerals, and description thereof is omitted.

The second embodiment is characterized in that, in order to suppress an abnormal increase in the catalyst temperature TCAT, the shift position SFT of the automatic transmission 26 is shifted to a higher speed position to reduce the reduction pear ratio, and at the same time the throttle valve opening command value THCMD is controlled such that the opening of the throttle valve 3 is decreased.

At the step S6, it is determined whether or not the present value of the accelerator pedal position AP exceeds the throttle valve opening command value THCMD, and if the answer is affirmative (YES), the program proceeds to steps for carrying out the engine operation control for protecting the catalytic converter 15.

Figure 6:
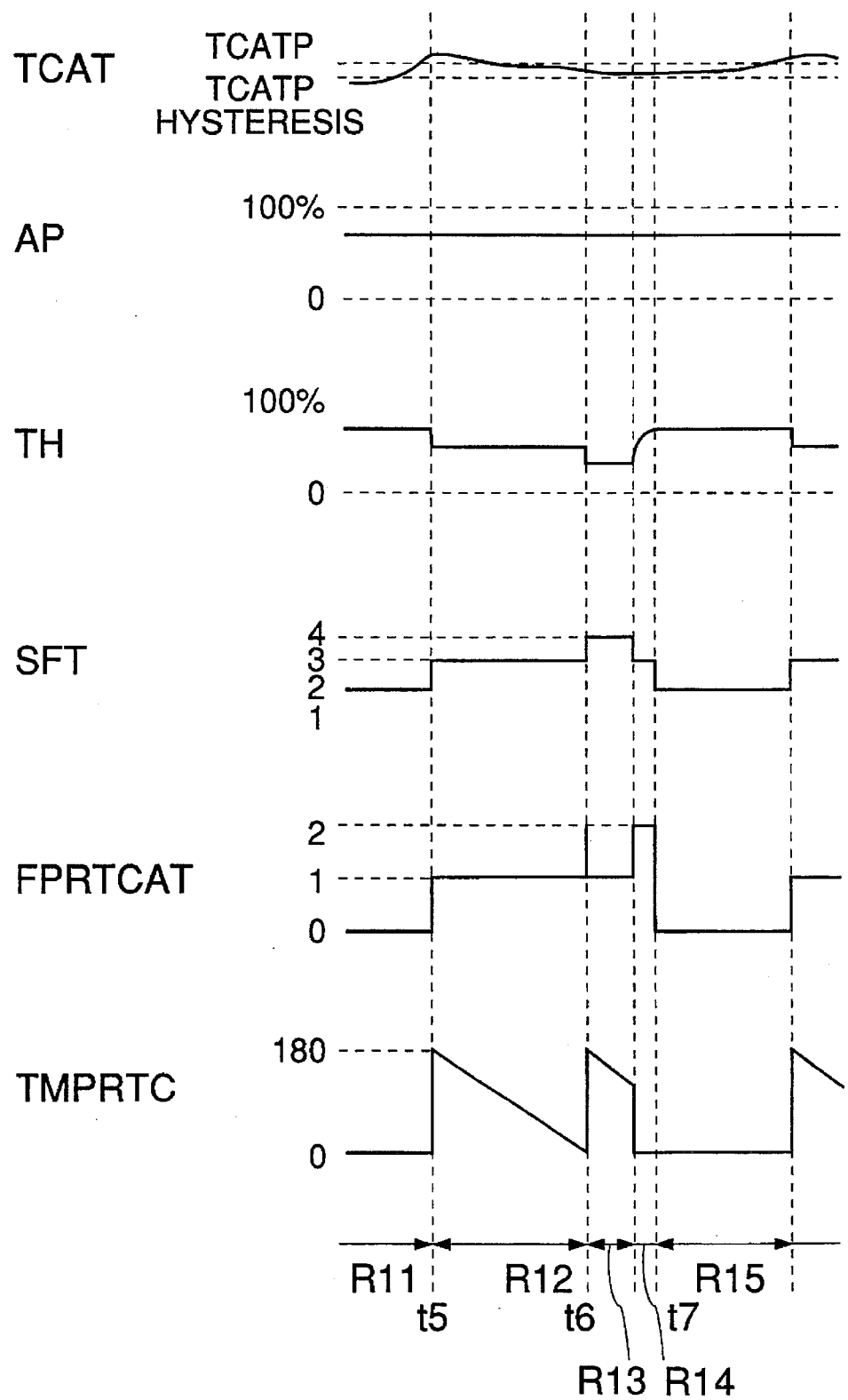
FIG. 6 is a timing chart showing the relationship between the catalyst temperature TCAT, a shift position SFT, a shiftup-inhibiting timer TMPRTC, etc.

FIG. 6 is a timing chart showing changes in the catalyst temperature TCAT, the shift position SFT, the state of a shiftup-inhibiting timer TMPRTC, etc. The present routine will be further described with reference to the timing chart of FIG. 6.

It is determined at a step S51 whether or not the protection flag FPRTCAT has been set to "1". If the flag FPRTCAT has been set to "1", it is determined that the engine operation control for catalyst protection is being carried out, while if it has been reset to "0" or set to "2", it is determined that the engine operation control for catalyst protection is not being carried out but should be started.

If it is determined at the step S51 that the protection flag FPRTCAT has been reset to "0" or set to "2", then it is determined at a step S52 whether or not the shift position FST of the automatic transmission 26 is the top gear position (e.g. 4th speed position). If the answer is negative (NO), the shift position SFT of the automatic transmission 26 is shifted up, e.g. switched from a 2nd speed position to a 3rd speed position (at a time point t5 in FIG. 6) to thereby reduce the reduction gear ratio.

Figure 7:
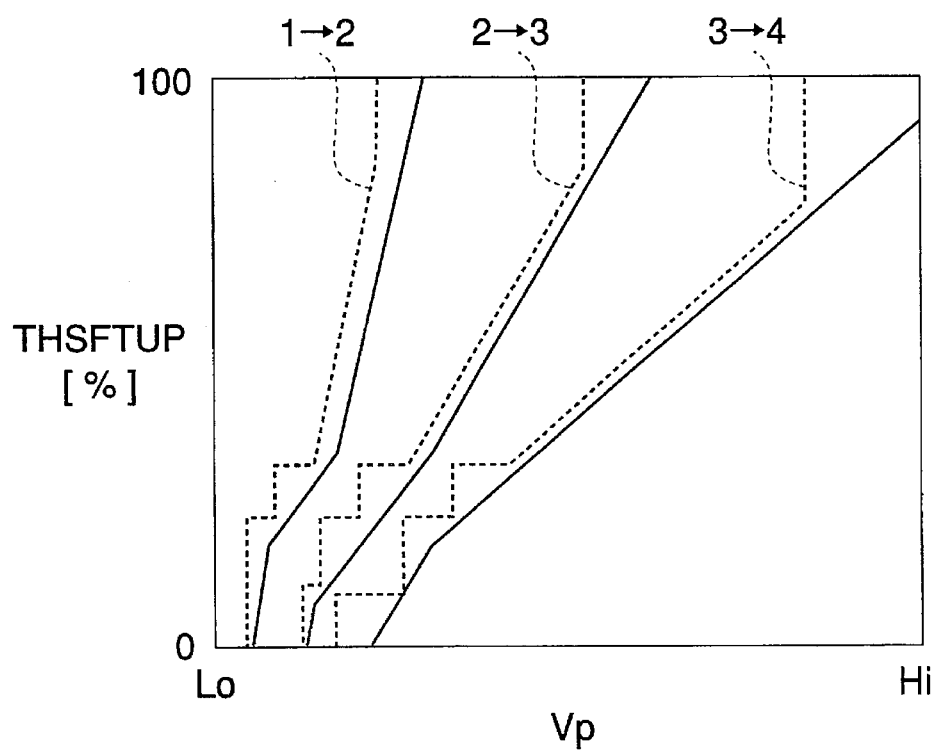
FIG. 7 is a table which is used for determining the throttle valve opening THSFTUP applied during a shiftup time period according to vehicle speed VP.

More specifically, the shiftup-inhibiting timer TMPRTC is set to a predetermined time period, e.g. 180 sec. at a step S53, and a shiftup throttle valve opening value THSFTUP which is applied when the gear of the transmission 26 is to be shifted up is read from a table shown in FIG. 7, according to the vehicle speed VP, at a step S54.

The thus read shiftup throttle valve opening value THSFTUP is set to the throttle valve opening command value THCMD at a step S55, and then the protection flag FPRTCAT is set to "1" at the step S12, followed by terminating the present routine.

By thus setting the shiftup throttle valve opening value THSFTUP to the THCMD value at the above step S55, shifting-up of the automatic transmission is carried out by the CPU, e.g. from the 2nd speed position to the 3rd speed position, as shown in FIG. 6.

When the present routine is again executed in the next loop, the protection flag FPRTCAT has then been set to "1" at the step S12, so that the answer to the question of the step S51 becomes affirmative (YES), and then it is determined at a step S56 whether or not the count value of the shiftup-inhibiting timer TMPRTC is equal to or less than "0". So long as the count value has not reached "0", the shiftup throttle valve opening value THSFTUP read at the step S54 is repeatedly set to the throttle valve opening command value THCMD at the step S55, as mentioned above, to thereby repeatedly inhibit further shifting-up of the transmission processing.

If the count value of the shiftup-inhibiting timer TMPRTC has become equal to or less than "0", the last value THCMD$_{-1}$ of the throttle valve opening command value THCMD is set to the present value at a step S57, and then the protection flag FPRTCAT is set to "2" at a step S57, as shown at a time point t6 in FIG. 6, followed by terminating the present routine. If the protection flag FPRTCAT is thus set to "2", the answer to the question at the step S51 becomes negative (NO), and accordingly the program proceeds to the step S52. As mentioned above, when the shift position SFT is not the top gear position (4th speed position), shifting-up of the automatic transmission 26 is carried out at the steps S54 and S55. Thus, the shift position is switched from the 3rd speed position to the 4th speed position at the time point t6 in FIG. 6.

On the other hand, if the catalyst temperature TCAT subsequently becomes lower than the upper limit value TCATP and at the same time the engine has not continuously been in a high speed and high load condition over the predetermined time period (steps S3–S5), the program proceeds to the step S7.

At the step S7, since on this occasion the protection flag FPRTCAT has been set to "1" or "2" as mentioned above, the program proceeds to the step S13 to progressively increase the throttle valve opening command value THCMD so that the automatic transmission 26 is shifted down to thereby increase the reduction gear ratio, as shown in a region R14 in FIG. 6. If the throttle valve opening command value THCMD becomes lower than a value corresponding to the accelerator pedal position AP at the step S14, the protection flag FPRTCAT is set to "2" at the step S15, and then the shiftup-inhibiting timer TMPRTC is reset to "0" at a step S58, followed by terminating the present routine.

In this manner, while the throttle valve opening command value THCMD is below a value corresponding to the accelerator pedal position AP, the throttle valve opening command value THCMD is progressively returned to a value corresponding to the accelerator pedal position AP, as shown in the region R14 in FIG. 6, so that the automatic transmission 26 is stepwise shifted down, e.g. from the 4th speed position to the 2nd speed position as shown in the region R14 in FIG. 6, to thereby increase the reduction gear ratio. When the throttle valve opening command value THCMD is increased above the accelerator pedal position AP, the ordinary engine operation control is carried out at the step S8, et sec., as shown in a region R15 in FIG. 8.

As described above, according to the second embodiment of the invention as well, substantially the same results as in the first embodiment can be achieved.

The control system according to the present invention may be applicable to an internal combustion engine which is provided with an ordinary throttle valve driving system instead of the DBW system.

What is claimed is:

1. A control system for an internal combustion engine for use in a vehicle, said engine having an intake system, intake air amount-regulating means associated with said intake system, for regulating an amount of intake air supplied to said engine, an exhaust system, and a catalytic converter arranged in said exhaust system, for purifying noxious components present in exhaust gases emitted from said engine, comprising:
   temperature-determining means for determining whether said catalytic converter is in a predetermined high temperature condition;
   operating condition-determining means for determining whether said engine has continuously been in an operating condition in which rotational speed of said engine exceeds a predetermined value and load on said engine exceeds a predetermined value, over a predetermined time period; and
   control means responsive to at least one of outputs from said temperature-determining means and said operating condition-determining means, for controlling said intake air amount-regulating means in a manner such that said amount of intake air supplied to said engine is decreased.

2. A control system as claimed in claim 1, wherein said vehicle has an accelerator pedal, said intake air amount-regulating means comprising a throttle valve, said engine including electric driving means for electrically driving said throttle valve in response to a position of said accelerator pedal, said control means controlling said electric driving means to drive said throttle valve so as to reduce opening of said throttle valve in response to at least one of said outputs from said temperature-determining means and said operating condition-determining means.

3. A control system as claimed in claim 1 or 2, wherein said temperature-determining means includes at least one of exhaust system temperature-detecting means for detecting temperature of said exhaust system, and catalyst temperature-detecting means for directly detecting temperature of said catalytic converter, said temperature-determining means determining that said catalytic converter is in said predetermined high temperature condition when at least one of said temperature detected by said exhaust system temperature-detecting means and said temperature detected by said catalyst temperature-detecting means exceeds a predetermined value.

4. A control system as claimed in claim 2, wherein said vehicle includes an automatic transmission, said control means including transmission control means for reducing a reduction gear ratio of said automatic transmission when said control means controls said electric driving means so as to reduce the opening of said throttle valve.

5. A control system as claimed in claim 3, wherein said vehicle includes an automatic transmission, said control means including transmission control means for reducing a reduction gear ratio of said automatic transmission when said control means controls said electric driving means so as to reduce the opening of said throttle valve.

6. A control system as claimed in claim 4, wherein said control means includes inhibiting means for inhibiting said transmission control means from further reducing said reduction gear ratio of said automatic transmission, over a predetermined time period after said transmission control means reduced said reduction gear ratio of said automatic transmission.

7. A control system as claimed in claim 4, wherein said transmission control means reduces said reduction ratio of said automatic transmission by setting a desired opening value of said throttle valve according to speed of said vehicle.

8. A control system as claimed in claim 2, wherein said control means controls said electric driving means to reduce the opening of said throttle valve in response to at least one of said outputs from said temperature-determining means and said operating condition-determining means, when said desired opening value of said throttle valve is below a value corresponding to the position of said accelerator pedal.

9. A control system as claimed in claim 8, wherein said control means controls said electric driving means to progressively reduce the opening of said throttle valve at a rate based on the rotational speed of said engine.

10. A control system as claimed in claim 5, wherein said control means includes inhibiting means for inhibiting said transmission control means from further reducing said reduction gear ratio of said automatic transmission, over a predetermined time period after said transmission control means reduced said reduction gear ratio of said automatic transmission.

11. A control system as claimed in claim 5, wherein said transmission control means reduces said reduction ratio of said automatic transmission by setting a desired opening value of said throttle valve according to speed of said vehicle.

* * * * *